US006646929B1

(12) United States Patent
Moss et al.

(10) Patent No.: US 6,646,929 B1
(45) Date of Patent: Nov. 11, 2003

(54) METHODS AND STRUCTURE FOR READ DATA SYNCHRONIZATION WITH MINIMAL LATENCY

(75) Inventors: Robert W. Moss, Longmont, CO (US); Peter Korger, Frederick, CO (US)

(73) Assignee: LSI Logic Corporation, Milpitas, CA (US)

( * ) Notice: Subject to any disclaimer, the term of this patent is extended or adjusted under 35 U.S.C. 154(b) by 70 days.

(21) Appl. No.: 10/012,986

(22) Filed: Dec. 5, 2001

(51) Int. Cl.[7] .................................................. G11C 7/00
(52) U.S. Cl. ........................................ 365/194; 365/193
(58) Field of Search ................................... 365/194, 193

(56) References Cited

U.S. PATENT DOCUMENTS 5,406,427 A * 4/1995 Shimoda ..................... 360/51
5,774,697 A * 6/1998 Hall ........................... 395/500
6,332,010 B1 * 12/2001 Lee ............................ 375/368

* cited by examiner

*Primary Examiner*—M. Tran
(74) *Attorney, Agent, or Firm*—Lathrop & Gage, L.C.

(57) ABSTRACT

Methods and associated structure for realignment of returned read data from the memory component to the memory controller to adjust for phase shift in the memory device's supplied strobe signals due to propagation delays and other layout, fabrication and environmental factors. The realignment features of the present invention impose a calibrated delay on the memory controller's clock signal used to sample registered read data from the memory components. By so adjusting the alignment of returned read data with respect to the memory controller's clock, the present invention obviates the need for an asynchronous FIFO as is presently commonly practiced in the art to avoid such phase shifts between memory components and associated memory controller's.

20 Claims, 3 Drawing Sheets

METHODS AND STRUCTURE FOR READ DATA SYNCHRONIZATION WITH MINIMAL LATENCY

BACKGROUND OF THE INVENTION

1. Field of the Invention

The invention relates to high-performance memory subsystems including, for example, DDR SDRAM memory components. More specifically, the present invention relates to methods and associated structure for synchronizing the process of reading data between high-performance memory components and the associated memory controller device.

2. Discussion of Related Art

A number of present-day computing systems and other present-day applications utilize high-performance memory subsystems to store and retrieve data. For example, a high-performance computing system stores its programmed instructions and associated data in a high-performance memory subsystem for rapid fetching and execution of the associated program. Numerous memory architectures are known to provide the requisite high levels of performance. Generally, a system stores data in a memory subsystem by issuing write commands from the memory controller to the memory components and retrieves the stored data by issuing read commands from the memory controller to the memory components. Most such high-performance memory subsystems include features to read (or write) sequential locations in the memory components in response to a single read (or write) command. In other words, the memory components themselves return sequential locations after being directed to the first location associated with the read command. In high-performance memory subsystems the memory components may receive a clock signal from the memory controller and the memory components themselves provide a strobe signal used to indicate when valid data is available on the associated data bus as the various sequential locations of a burst read command are made available from the memory component.

In high-performance memory subsystem architectures, the data, clock and strobe signals between the memory components and the memory controller may be affected in a significant manner by propagation delays induced by design, layout, fabrication and environmental aspects of the overall system design. For example, lengthy conductive signal paths within a system design may impose significant propagation delays, ambient operating temperatures associated with the operational memory subsystem may affect timing of clock and strobe signals, and other well-known factors may impact timing relationships among these various signals critical to operation of the high-performance memory subsystem. Propagation delays generated by such environmental factors and design factors may be so severe as to dramatically change the phase relationship between the data, clock and strobe signals generated by the memory components and memory controller. Such delays may be so severe as to cause many of the signals to become meta-stable with respect to the memory controller and memory components interface timing specifications. In addition to problems of meta-stability, such timing problems may result in data loss (i.e. loss of data when an improper phase relationship causes more that one data to occur in a single sample interval). These timing problems are exacerbated by burst memory operations where the cycling of the signals is faster than in shorter single read or write command operations or other command processing. These timing issues are still further exacerbated by the still faster timing of double data rate (DDR) memory components (such as DDR SDRAMs) wherein data is returned on both the leading edge and the trailing edge of each strobe signal pulse.

One common solution to this design problem as presently known in the art is to provide an asynchronous FIFO such that the memory components control the write logic of the asynchronous FIFO (to fill the FIFO with data on read operations) while they memory controller manages operation of the read portion of the asynchronous FIFO (to retrieve read data returned in response to a read command). The asynchronous nature of such a FIFO isolates and separates the two clocking functions, namely: clocking relationships generated by the memory components that operate the write logic of the FIFO and the clocking relationships generated by the memory controller to read data from the FIFO.

Problems arise from use of such a FIFO in that performance of the memory subsystem may be degraded due to additional complexities and associated latencies entailed in moving read data through the asynchronous FIFO. For example, the read portion of the asynchronous FIFO managed by the memory controller must await information signals from the FIFO indicating that the FIFO is empty or not empty before attempting to read data transferred from the memory devices through the asynchronous FIFO. Generation of these signals within the FIFO control logic as well as the logic required to store data in and retrieve data from the FIFO all add delay to the return of requested read data. These additional latencies involved in reading data from a memory subsystem can have significant impact on overall system performance.

Further, use of such an asynchronous FIFO to obviate complexities of clock, data and strobe synchronization adds significant complexity to the overall circuit design. Such an asynchronous FIFO and related glue logic requires a significant number of gates.

It is evident from the above discussion that a need exists for an improved method and structure for synchronization of clocks and strobes in the return of read data from a high-performance memory subsystem.

SUMMARY OF THE INVENTION

The present invention solves the above and other problems, thereby advancing the state of useful arts, by providing methods and associated structure for using predetermined phase calibration information associated with the memory component data, clock and strobe signals to adjust and re-align the return of read data from the memory components. More specifically, returned read data is captured (registered) using a delayed version of the memory controller's clock signal that is delayed to re-align with the strobe signal generated by the memory component. The delay is programmed in accordance with a predetermined delay determined from the circuit design. The predetermined delay period may be determined by hand calculation or by empirical static or dynamic measurements of the operating system. The steps to acquire the predetermined delay period are beyond the scope of the present invention. Rather, the present invention relates to use of such a predetermined delay value to adapt and re-align the registering of the returned read data.

The synchronization and realignment feature of the present invention obviates the need for a FIFO component to achieve desired phase matching between the data as clocked out by the memory component and the corresponding data as clocked in by the memory controller device. Eliminating the need for such an asynchronous FIFO reduces the added latencies generated by use of such a FIFO and reduces the gate count in the memory controller circuits because the logic and associated with the realignment feature of the present invention requires fewer gates and flip-flops than does an asynchronous FIFO as is commonly practiced in the art.

A first aspect of the invention provides a circuit for realigning read data returned to a memory controller from an associated memory component, the circuit including: a clock signal path on which a clock signal generated by the memory controller is applied for sampling the read data returned from the memory component wherein the clock signal has a predetermined desired phase relationship with a strobe signal generated by the memory component; a delay line coupled to the clock signal path to generate a delayed clock signal wherein the delayed clock signal is delayed to compensate for a predetermined phase offset from the desired phase relationship between the clock signal and the strobe signal.

In another aspect of the invention the delay line is a programmable delay line.

In still another aspect of the invention, the invention further provides for a first register clocked by the delayed clock signal and having an input adapted to receive the sampled data for registering the sampled read data in a first clock domain; and a second register clocked by the clock signal and having an input coupled to an output of the first register for reregistering the sampled data in a second clock domain.

Another aspect of the invention further provides for an inverter coupled to the clock signal path for generating an inverted clock signal; a third register clocked by the inverted clock signal and having an input coupled to the output of the first register for reregistering the sampled data in a third clock domain, wherein the second register is adapted to selectively receive on its input the output of the third register or the output of the first register.

Still another aspect of the invention provides for a comparator for determining if the delayed clock signal is sufficiently delayed from the clock signal to permit application of the output of the first register to the input of the second register without violating timing requirements of the second register; and a multiplexor having a selection input coupled to the output of the comparator and having the output of the first register coupled to a first input and having the output of the third register coupled to a second input to selectively apply the output of the third register to the input of the second register or the output of the first register to the input of the second register.

Yet another aspect of the invention further provides for an AND gate having its output coupled the input of the third register and having the output of the first register coupled to a first input and having the output of the comparator coupled to a second input, wherein the AND gate prevents metastability of the third register by gating the input to the third register.

DETAILED DESCRIPTION OF THE PREFERRED EMBODIMENTS

Figure 1:
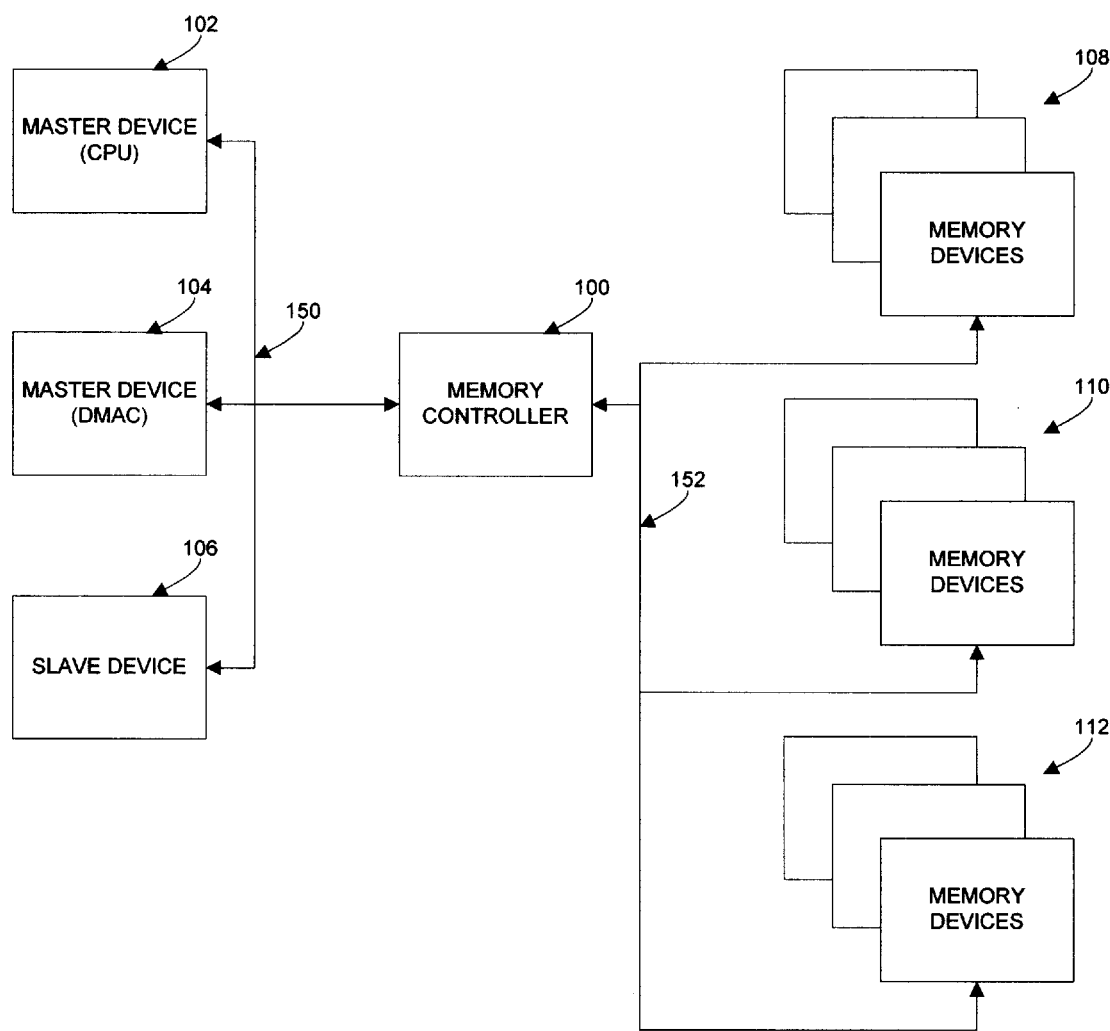
FIG. 1 is a block diagram of a typical system configuration using a memory controller to interface between master devices and a memory subsystem.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a typical system as known in the art in which a memory controller 100 serves to interface between master and slave devices 102, 104 and 106 and memory devices 108 through 112. In particular, as is presently known in the art, a memory controller 100 receives read and write memory requests via path 150 from master devices 102 and 104 and the directs the memory requests to appropriate ones of memory devices 108 through 112. Memory devices in high performance memory subsystems are typically grouped into banks of memory such that each bank may be allowed to overlap its operation with that of other banks. As depicted in FIG. 1 three banks of memory are shown each comprising three memory components or devices all coupled via path 152 to memory controller 100.

Memory controller 100 serves to hide details of manipulation of the memory devices from requesting devices 102 through 106. Details such as burst operation, row and column addressing signals, etc. are all handled within memory controller 100 to thereby free devices 102 through 106 from such low-level detail.

As noted above, problems exist in present memory controllers due to significant propagation delays caused by design, layout and fabrication of circuits within the system as well as environmental factors. In many high-performance memory subsystems critical timing and phase relationships are required in signals exchanged between the memory controller 100 and memory devices 108 through 112. The above identified propagation delays can reach such levels that critical margins for such timing and phase relationships may be exceeded. Still more specifically, the interaction between a memory controller and typical DDR SDRAM memory components includes applying a clock generated by the memory controller to the memory components and the supply of a strobe signal generated by the memory components and applied to the memory controller indicative of the availability of requested read data. Typical DDR SDRAM devices require certain timing and phase relationships between the clock generated by the memory controller and the data strobe generated by the memory component. Under extreme conditions of signal propagation delays, these timing and phase relationships may be exceeded to a point that certain signals between the memory controller and memory components may become meta-stable—a condition frequently at the heart of broad-based system failures. More generally, timing problems may relate to synchronization with fixed frequency but variable phase. Meta-stability is one aspect of this broader problem addressed by the present invention.

Figure 2:
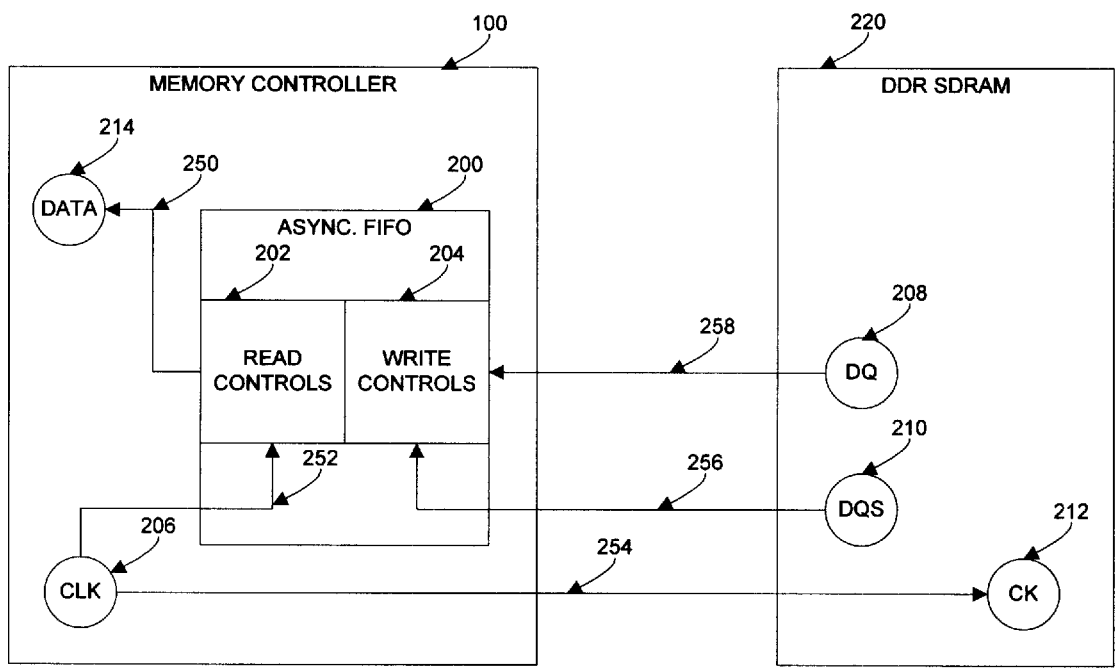
FIG. 2 is a block diagram showing additional details of a memory controller as presently known in the art that uses an asynchronous FIFO to correct timing problems.

FIG. 2 depicts one common approach to reduce the impact of such timing problems on interaction between a memory controller 100 and a memory component 220 (such as a DDR SDRAM). Some present memory controllers include an asynchronous FIFO used, in part, to isolate the operations required to return data from the memory component to the memory controller. By so isolating the operations, some of the criticality of the required timing and phase relationships is reduced.

In particular, asynchronous FIFO 200 within memory controller 100 includes write control logic 204 clocked, in essence, by data strobe DQS 210 supplied by memory component 220. Read control logic 202 of asynchronous FIFO 200 is clocked by CLK 206 generated within memory controller 100. Since the write control logic 204 within asynchronous FIFO 200 is clocked essentially independently of read control logic 202 the timing relationship between the strobe signal DQS 210 generated by memory component 220 and clock signal CLK 206 generated and utilized within memory controller 100 is less critical.

However, as noted above, introduction of asynchronous FIFO 200 generates additional latencies in the processing of returned read data. Additional logic signals within read control logic 202 are required to detect that the FIFO memory is not empty in order to read data stored therein. These additional logic signals that allow for the detection of the presence of data in an asynchronous, robust fashion cause additional latency in a FIFO based design.

Figure 3:
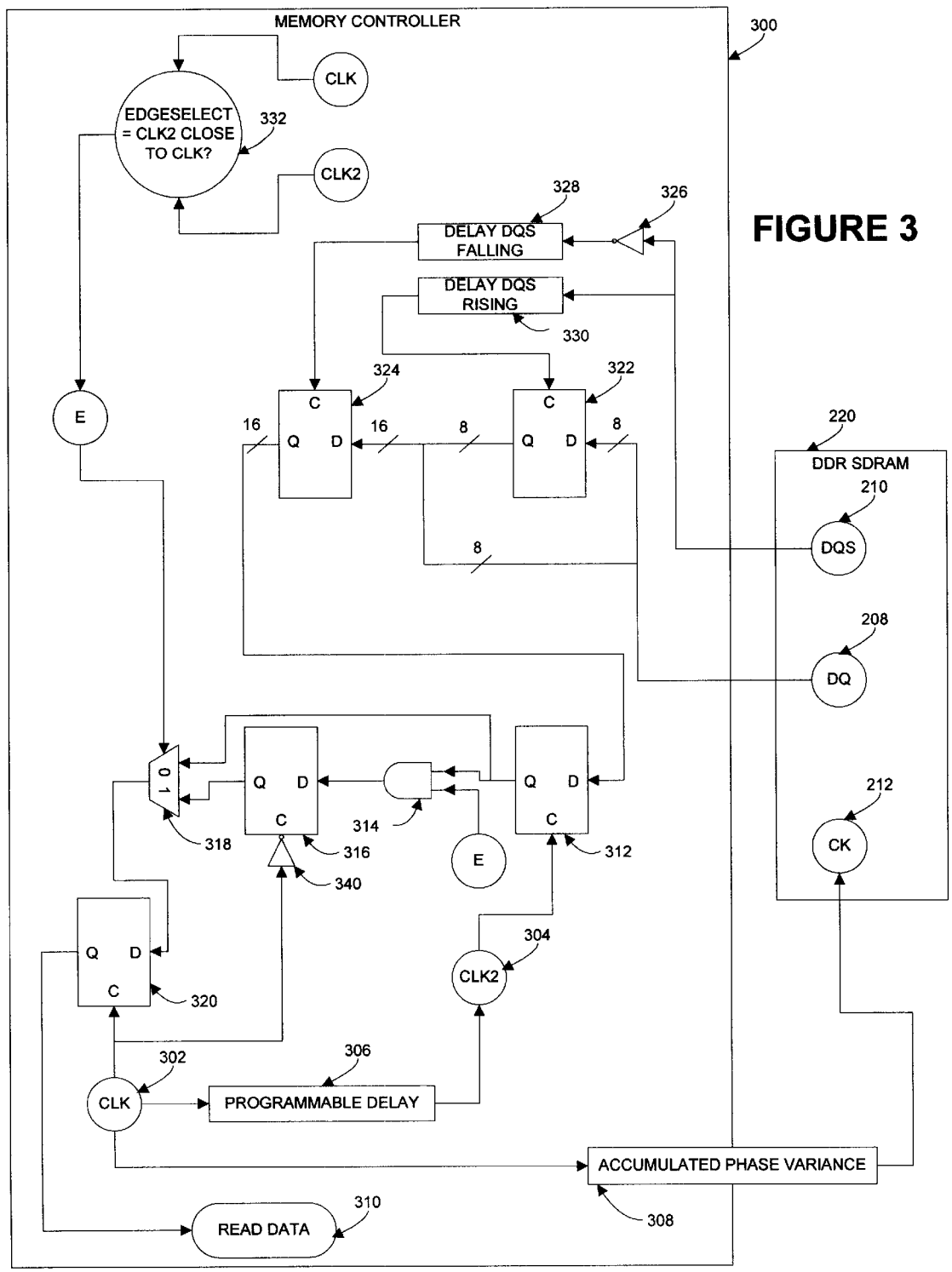
FIG. 3 is a block diagram of a memory controller that realigns and adjusts the data capture to adhere to required timing phase relationships.

As noted above, it remains desirable to improve interaction between a memory controller and associated memory components to adhere to required timing constraints without resorting to additional latencies imposed by an asynchronous FIFO within the memory controller. FIG. 3 is a block diagram of a circuit in accordance with the present invention to improve the memory interface between a memory controller 300 and an associated memory device 220. As above, the exemplary memory device is depicted as a DDR SDRAM device. Those skilled in the art will recognize that the methods and structure of the present invention may be applicable to a wide variety of memory controllers coupled to a wide variety of memory components. DDR SDRAM 220 is therefore intended merely as exemplary of all such memory components. Key to the present invention is the critical timing and phase relationships between the strobe signal DQS 210 generated by the memory component and the clock signal CLK 302 used by memory controller 300. Other types of memory components that require precise phase relationships between clock and strobe signals may benefit from the features of the present invention as discussed below.

As noted above, memory component 220 signifies availability of data to be returned to the memory controller by asserting data strobe DQS 210. However, memory component 220 has no clock of its own but rather receives clock CK 212 from memory controller 300 CLK 302. Circuits of the present invention within memory controller 300 adjust or realign relationships between strobe DQS 210 as received in memory controller 300 and clock CLK 302 from memory controller 300 to maintain the required phase relationships for proper operation without the need for an asynchronous FIFO.

In general, the present invention synchronizes or realigns signals exchanged between memory controller 300 and memory device 220 to avoid potential errors due to phase offsets between the signals from propagation delays. Data received at the memory controller is first registered in the data strobe (DQS 210) clocking domain and then reregistered in the domain of CLK 302 delayed appropriately to compensate for measured or calculated phase offset. More specifically, the registered data from the DQS domain is registered in the CLK2 domain—a clock derived from CLK through a predetermined delay element.

The potential propagation delay associated with application of CLK 302 to CK 212 input of memory component 220 is represented by accumulated phase variance 308. Accumulated phase variance 308 represents the accumulated effect of various sources of signal delay that will result in DQS being out of phase with CLK. Exemplary contributing elements include (but are not limited to): CLK clock jitter, output pad delay, output pad thermal variation in delay, PC board loading, termination resister quality, CLK→DQS variance through DRAM, input pad delay, input pad thermal variance, DLL non-linearity, etc.

DQS 210 is applied to delay line 330 and also to delay line 328 via the inverter 326. Those of ordinary skill in the art will recognize that in a double data rate (DDR) SDRAM component, data is available on both the rising and falling edge of strobe DQS 210. Delay lines 328 and 330 therefore serve to delay the corresponding falling or rising edge of data strobe DQS 210 for application as a clock signal to register flip-flops 322 and 324. As is known in the art, memory controller 300 must skew DQS 210 to capture data on DQ 208 in the center of the edges of DQS transitions (a 25% phase shift under ideal conditions).

Register flip-flop 322 registers eight bits of data generated by data signal DQ 208 in memory component 220 on the delayed rising edge of strobe DQS 210. In like manner, delay line 328 applies the delayed data strobe signal as a clock to register flip-flop 324 to register the corresponding eight bits on the falling edge of strobe DQS 210 in addition to the eight bits previously registered by flip-flop 322 on the rising edge of strobe DQS 210. The 16-bit value so registered in flip-flop 324 is then applied to further circuitry within memory controller 300 clocked by clock signal CLK 302 (and delayed versions thereof).

Those skilled in the art will recognize that the particular memory size and geometry, and hence the width of the various signal paths and components of FIG. 3, are well-known matters of design choice. Use of 8-bit wide DDR SDRAM memory components is one exemplary common design choice suggesting the use of 8 and 16 bit wide paths and components in the circuits of FIG. 3. Other configurations including 4 and 16 bit wide memory components are common and may be selected by those skilled in the art with corresponding changes to the path and component widths in FIG. 3.

Elements 322 through 330 of memory controller 300 are said to be operable in the DQS 210 clock domain. Elements 302 through 320 (and 332) are, by contrast, clocked in the domain of the clock signal CLK 302 within memory controller 300. In particular, clock signal CLK 302 is applied to programmable delay line 306 to generate delayed clock signal CLK2 304. Delayed clock signal CLK2 304 is used to clock flip-flop 312 to reregister (or realign) data previously registered in register flip-flop 324 translated to the domain of clock signal CLK 302. Delayed clock signal CLK2 304 is delayed a sufficient amount to compensate for phase offset errors between clock 302 and data strobe DQS 210.

As noted herein, the amount of such delay required to compensate for phase offset errors is determined through methods and structure outside the scope of this invention. Such a delay value may be determined by calculation of the designer based on analysis of the design, layout and fabrication. In addition, the delay value may be determined by automated measuring methods and structure associated with the present invention that automatically determines a preferred delay period to optimally compensate for phase offset errors between CLK 302 and strobe DQS 210.

Following reregistration of the present data values returned from memory component 220 in flip-flop register 312 within the clock domain of delayed CLK2 304, the registered value is again reregistered selectively by flip-flops 316 (clocked by CLK inverted through inverter 340) and 320 (clocked by CLK directly) in sequence or by flip-flop 320 alone. Register 316 registers on the falling edge of CLK (i.e., approximately one half clock period delayed). When the data is too close to the rising edge of CLK, register 320 receives the output of register 316 through multiplexor 318. Otherwise, register 320 receives the output of register 312 through multiplexor 318. An edge-select comparison 332 determines whether delayed clock CLK2 304 is sufficiently close to clock CLK 302. If comparison elements 332 determines that CLK2 is sufficiently close to the rising edge of CLK, an edge-select signal is asserted and applied to multiplexer 318 to select one of two inputs applied thereto. The edge-select signal is also applied to AND gate 314 to gate the application of register 312 onto the input of flip-flop register 316. This helps prevent register 316 from entering a metastable state. The data reregistered in flip-flop 320 is then applied as read data 310 within memory controller 300 for further processing of the returned read data.

The determination by edge-select comparison element 332 is dependent upon the particular circuit technology selected. In general, setup and hold times need to be meet for register 320, or else use register 316, plus margin. In practice 25% of a clock period may be "close enough" for comparison element 332 to assert the edge-select signal, but again, this determination is technology dependent and therefore a well-known matter of design choice for those of ordinary skill in the art.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A circuit for realigning read data returned to a memory controller from an associated memory component, said circuit including:
    a clock signal path on which a clock signal generated by said memory controller is applied for sampling said read data returned from said memory component wherein said clock signal has a predetermined desired phase relationship with a strobe signal generated by said memory component;
    a delay line coupled to said clock signal path to generate a delayed clock signal wherein said delayed clock signal is delayed to compensate for a predetermined phase offset from said desired phase relationship between said clock signal and said strobe signal.

2. The circuit of claim 1 wherein said delay line is a programmable delay line.

3. The circuit of claim 1 further comprising:
    a first register clocked by said delayed clock signal and having an input adapted to receive the sampled data for registering the sampled read data in a first clock domain; and
    a second register clocked by said clock signal and having an input coupled to an output of said first register for reregistering the sampled data in a second clock domain.

4. The circuit of claim 3 further comprising:
    an inverter coupled to said clock signal path for generating an inverted clock signal;
    a third register clocked by said inverted clock signal and having an input coupled to said output of said first register for reregistering the sampled data in a third clock domain,
    wherein said second register is adapted to selectively receive on its input the output of said third register or the output of said first register.

5. The circuit of claim 4 further comprising:
    a comparator for determining if said delayed clock signal is sufficiently delayed from said clock signal to permit application of the output of said first register to the input of said second register without violating timing requirements of said second register; and
    a multiplexor having a selection input coupled to the output of said comparator and having the output of said first register coupled to a first input and having the output of said third register coupled to a second input to selectively apply the output of said third register to the input of said second register or the output of said first register to the input of said second register.

6. The circuit of claim 5 further comprising:
    an AND gate having its output coupled the input of said third register and having the output of said first register coupled to a first input and having the output of said comparator coupled to a second input,
    wherein said AND gate prevents metastability of said third register by gating the input to said third register.

7. A method for realigning read data capture within a memory controller from an associated memory component, said method comprising:
    generating a delayed clock signal from a clock signal within said memory controller used for sampling read data from said memory component;
    generating a strobe signal with said memory component such that the clock signal has a predetermined phase relationship with said strobe signal; and
    sampling said read data from said memory component using said delayed clock signal.

8. The method of claim 7 wherein the step of generating said delayed clock signal comprises the step of:
    generating said delayed clock signal in accordance with a predetermined phase difference from said predetermined phase relationship.

9. The method of claim 7 wherein said strobe signal is indicative of the readiness of read data for return to said memory controller.

10. The method of claim 7 wherein the step of sampling includes the steps of:
    registering the sampled data in a first register clocked in the domain of said delayed clock signal; and
    reregistering the registered sampled data from said first register in a second register clocked in the domain of said clock signal.

11. The method of claim 10 further comprising the steps of:
    inverting said clock signal to generate an inverted clock signal; and
    reregistering the registered sampled data from said first register in a third register clocked in the domain of said inverted clock signal.

12. The method of claim 11 wherein the step of reregistering in said second register comprises the steps of:

determining if said delayed clock signal is sufficiently delayed from said clock signal to permit application of the output of said first register to the input of said second register without violating timing requirements of said second register; and selectively applying the output of said first register to said second register if said delayed clock signal is determined to be sufficiently delayed or applying said the output of said third register to said second register if said delayed clock signal is not sufficiently delayed.

13. The method of claim 12 further comprising the step of:

gating application of the output of said first register to the input of said third register to prevent metastability of said third register.

14. A system for realigning read data capture within a memory controller from an associated memory component, said system comprising:

means for generating a delayed clock signal from a clock signal within said memory controller used for sampling read data from said memory component;

means for generating a strobe signal with said memory component such that the clock signal has a predetermined phase relationship with said strobe signal; and means for sampling said read data from said memory component using said delayed clock signal.

15. The system of claim 14 wherein the means for generating said delayed clock signal comprises:

means for generating said delayed clock signal in accordance with a predetermined phase difference from said predetermined.

16. The system of claim 14 wherein said strobe signal indicative of the readiness of read data for return to said memory controller.

17. The system of claim 14 wherein the means for sampling includes:

means for registering the sampled data in a first register clocked in the domain of said delayed clock signal; and means for reregistering the registered sampled data from said first register in a second register clocked in the domain of said clock signal.

18. The system of claim 17 further comprising:

means for inverting said clock signal to generate an inverted clock signal; and means for reregistering the registered sampled data from said first register in a third register clocked in the domain of said inverted clock signal.

19. The system of claim 18 wherein the means for reregistering in said second register comprises:

means for determining if said delayed clock signal is sufficiently delayed from said clock signal to permit application of the output of said first register to the input of said second register without violating timing requirements of said second register; and means for selectively applying the output of said first register to said second register if said delayed clock signal is determined to be sufficiently delayed or applying said the output of said third register to said second register if said delayed clock signal is not sufficiently delayed.

20. The system of claim 19 further comprising:

means for gating application of the output of said first register to the input of said third register to prevent metastability of said third register.

\* \* \* \* \*